United States Patent [19]

Holtom

[11] 4,118,814
[45] Oct. 10, 1978

[54] MANUFACTURE OF BOAT HULLS AND OTHER HOLLOW ARTICLES

[76] Inventor: Gerald Herbert Holtom, 5 Hillside St., Hythe, Kent, England

[21] Appl. No.: 687,450

[22] Filed: May 18, 1976

Related U.S. Application Data

[63] Continuation-in-part of Ser. No. 632,634, Nov. 17, 1975, abandoned.

[51] Int. Cl.² .................. B63B 5/24; B29D 23/10; B29G 7/02
[52] U.S. Cl. .................................. 9/6 P; 156/189; 156/191; 156/193; 220/4 A; 220/4 B; 220/444; 264/137; 264/152; 264/163; 264/257; 264/2 61; 264/255; 264/263; 264/267
[58] Field of Search ............... 264/321, 334, 255, 271, 264/229, 157, 163, 136, 137, 174, 297, 310, 312, 258, 313, 135; 9/6 P; 156/184, 187, 188, 189, 190–193, 195, 250, 194, 199, 161, 162, 165, 166, 173, 304; 428/304, 310, 311

[56] References Cited

U.S. PATENT DOCUMENTS

| | | | |
|---|---|---|---|
| 3,044,256 | 7/1962 | Bayly et al. | 156/189 |
| 3,080,267 | 3/1963 | Schmalz | 9/6 P |
| 3,193,438 | 7/1965 | Schafer | 156/184 |
| 3,234,309 | 2/1966 | Graff | 264/137 |
| 3,300,355 | 1/1967 | Adams | 156/189 |
| 3,533,869 | 10/1970 | Ikeda et al. | 156/173 |
| 3,534,134 | 10/1970 | Matthews | 264/321 |
| 3,728,187 | 4/1973 | Martin | 156/162 |
| 3,819,796 | 6/1974 | Webster et al. | 264/321 |
| 3,962,394 | 6/1976 | Hall | 264/161 |
| 4,026,747 | 5/1977 | De Lorean et al. | 156/195 |

FOREIGN PATENT DOCUMENTS

| | | | |
|---|---|---|---|
| 850,421 | 10/1960 | United Kingdom | 264/255 |
| 1,253,473 | 11/1971 | United Kingdom | 264/255 |

Primary Examiner—Willard E. Hoag
Attorney, Agent, or Firm—Wigman & Cohen

[57] ABSTRACT

A boat hull is made by winding a layer of glass-fibre around a male mould, winding a layer of foam sandwich material on top of the glassfibre, and then winding a second layer of glassfibre on top of the foam.

12 Claims, 5 Drawing Figures

MANUFACTURE OF BOAT HULLS AND OTHER HOLLOW ARTICLES

This application is a continuation-in-part of my U.S. patent application Ser. No. 632,634 filed on Nov. 17, 1975, now abandoned.

The present invention relates to a method of constructing boat hulls or other hollow articles.

Foam Reinforced Plastic, commonly known as FRP, is used for constructing boat hulls. FRP consists of a low density core between outer layers of high density material. The core is shaped as required and the outer layers secured to it by a mechanical bond. The core material must be of sufficient stiffness and sufficiently shearproof to hold the outer skins apart. PVC Foam is an example of a core material of this type which possesses, in addition, the capacity for recovery after compression loading and therefore resistance to vibration. PVC Foam Glass Fibre and Polyester Resin are typical materials suitable for sandwich construction.

A known method of sandwich construction used in boat building is familiarised as the "Male Plug" or "Male Mould" Method. This method is to make a plug or mould constructed in the form of the required boat hull upside down and secured to a flat floor. It consists of athwartships frames or ribs fixed parallel to each other and to which battens are fixed longitudinally. The battens are spaced a few inches apart. PVC sheets are cut and "tailored" to the form and strained, heated or preformed so as to wrap approximately around the mould. These PVC foam panels are then secured to the wood battens from within the mould by wood screws, or by headless nails or spikes driven from the outside through foam and batten so as to hold the foam securely to the battens. Each panel of foam is butted against that which has been secured to the mould until the whole surface of the hull is covered, after which the gaps and butt joints between panels of foam are filled with grout and sanded fair, ready for the application of the outer skin.

Next, an outer skin lay-up in GRP proceeds with the application of a quick cure polyester resin applied to the surface of the PVC foam followed by layers of glass fibre in the form of chopped mat, unidirectional and/or woven rovings, wetted and fully impregnated with polyester resin. The surface is usually finished at this stage by grinding smooth.

The hull, consisting of PVC foam with an outer skin of GRP is moved from the wooden mould. Screws, nails or fastenings are removed from the inside to release the internal surface of the foam from the wood battens. The hull is then lifted clear of the mould, turned over and placed upright in chocks made ready to receive it.

Next an inner skin of GRP is provided in a similar manner as that of the outside of the hull, so as to form a "sandwich" of PVC foam between two skins of GRP mechanically bonded to each surface.

The construction of the deck, or "top section" of the hull proceeds either in the same manner as that of the hull or is built up with separate panels upon beams.

The disadvantages of the "Male Plug Method" are that:

a. Tailoring and cutting of foam in panels to fit compound curves is wasteful and requires a high degree of skill.

b. Certain portions of PVC foam must be fastened under varying degrees of tension to the wood battens of the mould. Since heat is generated by polyester resin in the course of curing, the surface of the PVC foam in contact with GRP laminations applied to it, is warmed thereby reducing the rigidity of the foam. At the same time, shrinkage occurs in the curing of the skin lamination. The effect of this action is to create distortions in the surface of the hull which appear as the skin cures and hardens. If a slow cure resin is used to minimise heat transference from lamination to foam, there is a danger of styrene being released from the resin upon the foam and causing softening and similar distortion, particularly in those areas where pressure has been applied to secure a tight fit between foam and mould.

c. Application of GRP laminations over a fixed mould from the horizontal at the centre of the hull to vertical at the gunwhale line cause inevitable variations in lay-up and consequent waste.

d. Standardised control of lay-up of both outside and inside skins becomes problematical when scaffolding is required to enable operators to handle resin and glass materials over the whole surface of the hull. Special ventilation must be provided for working upon the inside GRP skin.

e. The common use of slow cure resin enables an operator to complete one lamination of glass fibre and to allow this to cure partially before applying subsequent laminations. However, in this case it is necessary to grind and remove rough edges from the partially cured surface between each application of laminations.

f. Removal of the wood male-plug tend to cause damage to the plug itself and to the inner surface of the foam.

g. Lifting, turning and lowering the partially fabricated hull to enable the internal surface lay-up to take place makes demands upon the time and expertise of the builder, including the realignment of the hull in its upright position so as to avoid distortions developing during subsequent internal skin lay-up.

h. As a result of a,b,c,d,e and f, above, a considerable amount of filling and grinding is required to produce a standard of finish comparable with hulls built by other methods.

The "Male Plug Method" is usually employed for the construction of "one off" hulls or small numbers of hulls. Furthermore the structural advantage of the monocoq Sandwich Construction, in which compound curves are so effectively achieved, together with the ease with which local areas of the hull may be stressed by the use of woven and unidirectional fibres, must be balanced against the cost of effective lay-up control and finishing.

An object of this invention is to provide a method of constructing a boat hull by which the advantages of Sandwich Construction are preserved, the disadvantages reduced or avoided and the best use made of the materials employed.

The present invention consists in a method of constructing boat hulls or other hollow articles comprising providing a male mould, covering the mould with a first layer or layers of resin impregnated fibre, then with a winding of at least one layer of synthetic foam about the fibre, and winding at least a further layer of fibre impregnated with resin about the foam to form a sandwich of foam between the layers of fibre.

It is possible to remove the mould by cutting the sandwich into two parts and then to produce two hulls from one mould by making one said part as one complete hull. Alternatively a single, decked boat can be produced by using the method according to this invention. A further advantage of the present invention is that the method may be used by semi-skilled labour and for long production line operation.

According to one convenient method of applying the invention, by way of example, a small-craft hull is made specifically in relation to the opportunities offered by method and material. In this example, a yacht hull and deck is considered as one unit, the "top" and "bottom" sections of which are designed to absorb compression and tension loads exerted by fore and back stays.

An example of the method of construction is as follows: A rotatable mould is provided and the materials required for sandwich lay-up are mounted on a trolley alongside.

The mould is virtually a complete hull and deck unit smaller in diameter of section than the finished hull by the thickness of the finished sandwich lay-up. The mould is supported at either end, motorised and geared to revolve slowly so that the materials may be unwound and applied from their trolley mounting and wound in sequence and under tension onto the male mould. The mould is first coated with a release agent such as PVA or wax. Polyester resin is activated and applied in suitable width to the mould. Woven glass rovings of the same width and under tension are applied to the wetted resin. This in turn is followed up by a second application of resin and woven rovings and so on to the desired number of laminations of the inner skin, PVC foam of appropriate width, being wound under tension onto the last quick-cure wet lamination. This may be followed by a light wide mesh glass roving wound dry over the surface of the PVC foam to ensure that it is compressed firmly and accurately into the surface of the inner skin. Then follows the application of a coat of quick-cure resin. Lay-up of the outer skin laminations commences as soon as the quick-cure resin application to the PVC foam surface has sealed it sufficiently against styrene action. At this stage any faults in lay-up may be rectified by the application of fillers. Laminations proceed as with the inner skin, to the desired specification, Final finish can be achieved by the positioning of a "float," blade or wiper, set so as to smooth out and distribute excess resin as the mould revolves.

At this stage in a modification of the described method it is advantageous to provide a final finish by bandaging with a strip of material such as Melanex (Registered Trade Mark), aluminum foil of 1.001 inch thickness, or suitable polyester resistant film.

The final stage in the manufacture of the complete hull involves the removal of the male mould from within it by cutting the hull in half, removing the mould intact and joining the two halves together again. This may be conveniently done, if for example, prior to the application of the release agent, an insert is provided in the mould horizontally and at the point of maximum beam running round the hull to define a groove in the sandwich lay-up. By inserting a knife or saw at this point through the sandwich lay-up into the groove, a clean and precise cut may be guided round the hull to sever top from bottom. The top section is then removed and hoisted clear and the mould hoisted out of the bottom section. Foam from the top edge of the lower hull section may conveniently be gouged out to a suitable depth. Resin is then applied and a preformed tongue inserted into the groove. A similar groove is made in the lower edge of the top "deck" section of the hull. The tongue insert having been coated with resin, the top deck section is lowered onto the tongue and excess resin wiped away.

At this stage, when the resin skins are still in the process of curing, apertures, such as cockpit, hatches and windows may be cut out without fear of distortion. Effective bonding may also be achieved in this state i.e. before final cure has taken place, of internal bulkheads, keel stringers, floors and furniture, to the internal and external skins of the hull.

IN THE DRAWINGS

Figure 1:
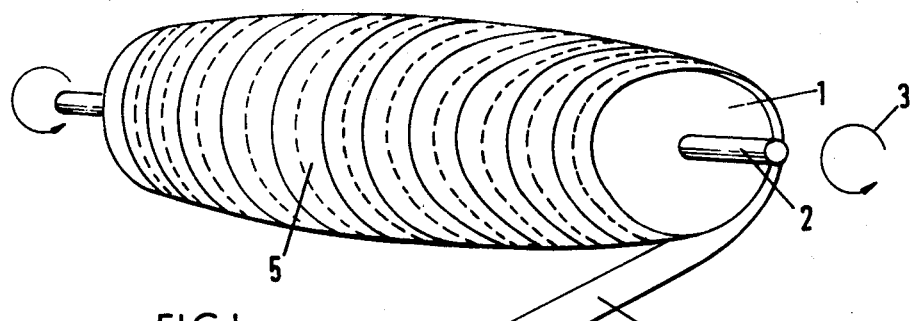
FIG. 1 shows completion of a first step of a method according to the invention.

In FIG. 1, a male mould or mandrel 1 is mounted on an axis or shaft 2 for rotation in a direction indicated by an arrow 3. A suitable drive (not shown) rotates the mandrel. A spool 4 of pre-formed glass fibre bandage 5 is mounted on an axle 6, and unrolled about the mandrel as the mandrel rotates. The spool 4 traverses along the length of the mandrel at an appropriate speed, so that adjacent turns of the bandage overlap each other.

Figure 2:
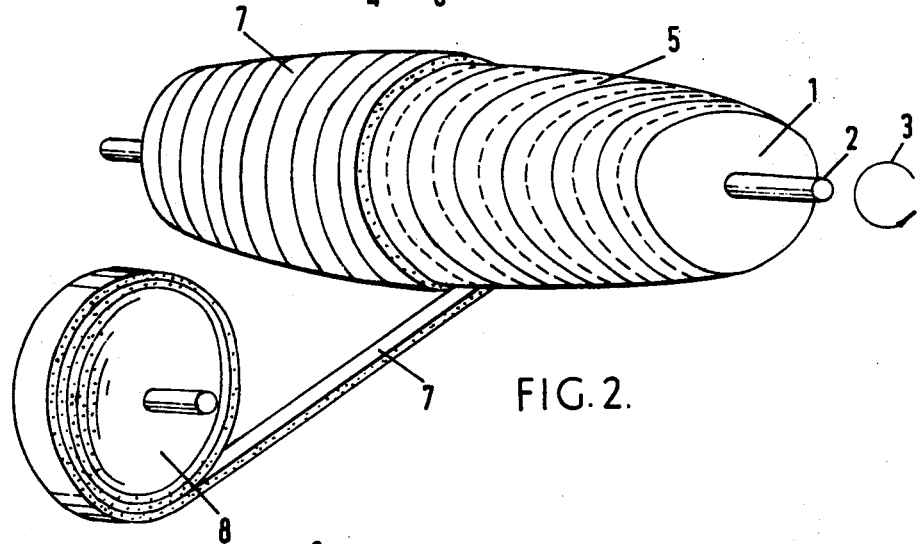
FIG. 2 shows an invention stage in a second step of the method.
Figure 3:
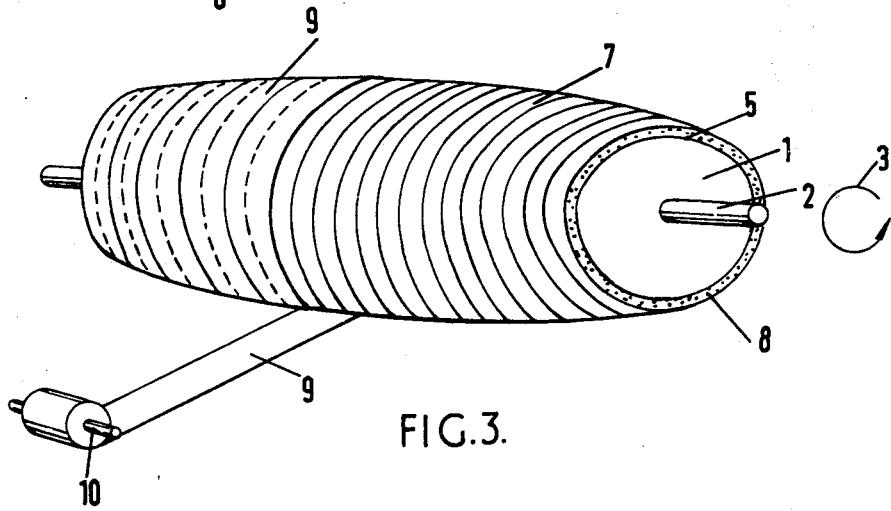
FIG. 3 shows an intermediate stage of a third step of the method.

FIG. 2 shows a layer of synthetic foam 7 being wound on top of the glass fibre 5. The foam is unwound from a spool 8 which traverses along the length of the mandrel as the foam is wound on. The edges of the foam being wound on abut the preceding turn. In FIG. 3, a further glass fibre bandage 9 soaked in resin is being wound on top of the foam skin 7. The bandage 9 is unwound from a spool 10 which again traverses along the length of the mandrel 1.

Figure 4:
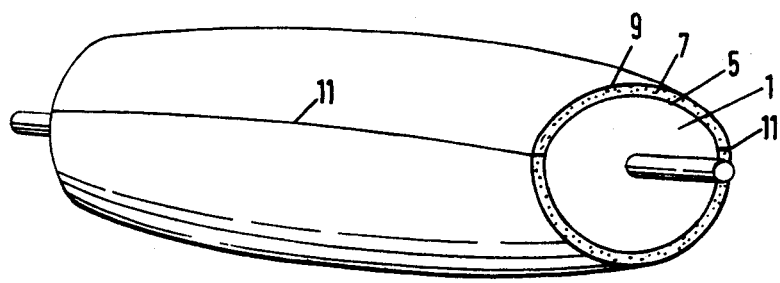
FIG. 4 is a view of a completed moulded article.

In FIG. 4, a completed moulding is shown. At the right hand end, the three layers of which the moulding is made up are shown. A cutting line 11 is shown along the length of the mandrel, on each side. It may be helpful if the surface of the mandrel is provided with longitudinal grooves to aid in guiding a knife along the line 11. After cutting along the lines 11, the upper and lower halves of the moulding can be separated, and removed from the mandrel.

Figure 5:
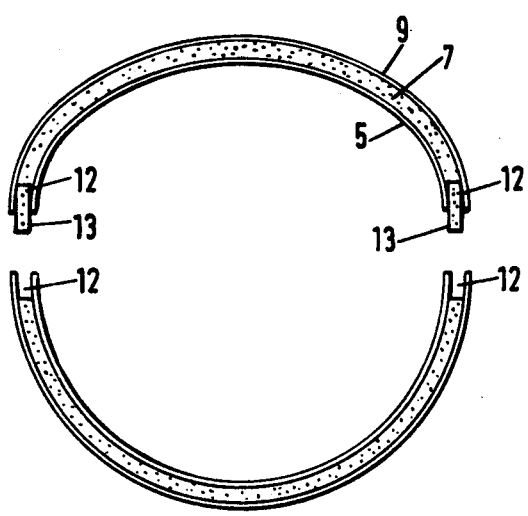
FIG. 5 is a cross-section through the article, removed from the mandrel, showing the manner in which the two halves are rejoined.

FIG. 5 shows an end view of the two halves of the moulding before rejoining. A portion of the foam at the edge of each half has been gouged out to form a recess 12, and in the recesses 12 in the upper half, fillet 13 of reinforced synthetic foam has been glued in. This fillet is made of the same material as the foam layer 7, reinforced on either side with glass fibre. The projecting parts of the fillets 13 are then lowered into the recesses 12 in the lower half of the moulding, and glued in place there so as to form a continuous hollow structure.

The hull is completed by adding a separately moulded bow section at one end, and closing the other end with a flat transom.

Variations of lay-up procedure may be employed, for example for the application of unidirectional fibres longitudinally by hand lay-up to the mould surface prior to the lay-up procedure of the inner skin, and again to the outer surface of the cured foam prior to lay-up of the outer skin.

Heat may be applied locally to either surface of the PVC foam during lay-up.

Widths of PVC foam may be increased by using foam in which grooves have been cut on one or both surfaces so that only the centre area is compressed in bending.

Ratio of thickness of foam core to GRP skins in sandwich boat hull construction may be about 6:1 for a PVC foam core of density of 5 lbs per cu.ft. Variations of skin thickness and in the composition of glass fibres in the skin laminations may be made to absorb local loading. Compression or "distance" pieces may be inserted in place of the PVC core where, for example, bolts are used through the core, having the effect of spreading the load between both skins. At these points it may be desirable to apply additional laminations to spread the load over a larger area of the skin surface than that of the compression insert. Compression plugs or plates and electrical circuits may conveniently be inserted into the PVC foam core prior to the application of the outer skin.

In the application of this example of the invention, a sandwich construction is used which simplifies the building of boat hulls in FRP. Rotation of the mould combined with the ability to control under tension, the application of materials laid up over compound curves is the basic advantage of the system. This applies in particular to PVC foam used as a core which is bonded effectively within the outer GRP skins.

By slight modifications to both hull design and the make-up of materials used in FRP construction, without detriment to the performance of hull or the mechanical and structural qualities of the materials, material wastage is eliminated, standardised structural control is achieved and much labour saved in relation to the present customary method of sandwich construction. The invention may be used both as a hand lay-up and a mechanical lay-up technique for the purpose of building production runs from the male mould.

Further advantages of the method according to the invention are as follows. Air bubbles within the resin are forced from each lamination to the surface by the tensioning of materials in narrow widths about the mould.

Shrinkage of resin while curing causes increased tensioning of glass fibre around the mould and ensures an accurate mechanical bond between the foam and glass fibre.

A chemical bond is established between the inner and outer layers of glass fibre along butt joints in the foam. This area of butt joint may be reinforced during lay-up with strands of fibre so as to provide an "H" section of GRP.

Quick-cure resin may be used not only to increase the speed of lay-up but to reduce or eliminate styrene action. In the case of polyester resin and semi-rigid unplasticised PVC foam, the foam is locally softened and distorted by slow curing resin.

Application of local heat to brittle or rigid PVC foam strips makes possible the use of this type of foam for bending around compound curves. Local heat at the point of lay-up may also increase the resin cure and lay-up speed. Resin pigmented in one or more colours may be used in both inner and outer skin laminations to provide internal and external colour finish.

The finished hull may be cut in two or more sections for removal from the mould within about fifteen minutes of completing the lay-up and virtually no distortion takes place. Because of the absence of distortion sections can be stored separately to cure without the need for chocks. After curing the parts can be fitted together with no misalignment or mating troubles. This would not be possible using conventional GRP methods Pre-stressing fibres during lay-up combined with exact control of resin to fibre ratios provides an improved strength to weight characteristic over conventional FRP methods.

Although the invention has been described primarily with the object of constructing boat hulls, the method is suitable for pipes, containers, wheelbarrows or any other articles suitable for the application of glass fibre and foam in the method described.

In the case of hollow article construction, the article may be made with parallel or tapered sides, and the mould can then be directly withdrawn from one end after construction has finished. A tube is an example of such an article.

It would also be possible for the mould to be collapsed inside the finished moulding, and for the mould parts to be subsequently withdrawn from the interior of the article.

The above methods of mould removal are disclosed as examples only. Any other appropriate method can be used.

I claim:

1. A method of constructing hollow articles comprising providing a male mould, coating the mould with a release agent, covering the release agent on the mould with at least a first layer of resin impregnated fibre, then with a winding of at least one layer of synthetic foam about the fibre, winding at least a further layer of fibre impregnated with resin about the foam with sufficient resin and under sufficient tension so that resin is forced into the joints between adjacent winds of foam to form a sandwich of foam between the layers of fibre and to form resin bridges connecting the first and further layers of fibre at the joints between adjacent winds of foam, removing the mould by cutting the sandwich into at least two parts, and rejoining the two parts with forming a tongue-and-groove interconnection in the foam layer.

2. The method of claim 1 further comprising winding a polyester resistant film around said further layer of fibre.

3. The method of claim 1 further comprising applying the foam in widths butt joined together.

4. The method of claim 1 wherein the first impregnated fibre layer is formed by coating the release agent on the mould with resin and winding a layer of fibre under tension on to the resin.

5. The method of claim 1 wherein the mould is arranged to be rotated.

6. The method of claim 1 wherein the mould is held stationary and the synthetic foam and fibre and wound about the mould.

7. The method of claim 1 wherein resin is applied to the outer surface of the foam and at least an outer layer of fibre is wound on to the resin to form the further impregnated layer of fibre.

8. The method of claim 1 wherein pigment is applied to at least one of the layers of resin impregnated fibre.

9. The method of claim 1 wherein heat is applied to the foam before winding the foam on to the mould.

10. A hollow article constructed by the method of claim 1.

11. A method of constructing a boat hull with an integral deck comprising providing a male mould, coating the mould with a release agent, covering the release agent on the mould with at least a first layer of resin impregnated fibre, then with a winding of at least one layer of synthetic foam about the fibre, winding at least a further layer of fibre impregnated with resin about the foam to form a sandwich of foam between the layers of fibre, removing the mould by cutting the sandwich into at least two parts and rejoining the parts with forming a tongue-and-groove interconnection in the foam layer to form a hollow hull.

12. A boat hull constructed by the method of claim 11.

* * * * *